US008625564B2

(12) United States Patent
Kawasaki

(10) Patent No.: US 8,625,564 B2
(45) Date of Patent: Jan. 7, 2014

(54) CONTACT DETECTION BASED RADIO CHANNEL SELECTION APPARATUS AND METHOD

(75) Inventor: Kenichi Kawasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 412 days.

(21) Appl. No.: 11/678,365

(22) Filed: Feb. 23, 2007

(65) Prior Publication Data

US 2007/0265036 A1    Nov. 15, 2007

(30) Foreign Application Priority Data

Mar. 1, 2006    (JP) ................................ 2006-055217

(51) Int. Cl.
    *H04H 20/67*    (2008.01)
(52) U.S. Cl.
    USPC ........... 370/339; 370/420; 370/423; 370/507; 370/510; 370/512; 370/515; 455/553.1; 709/228; 709/237; 709/249; 709/250
(58) Field of Classification Search
    USPC ......... 455/102, 562.1, 575.7, 189.1; 370/204, 370/323, 325, 334, 339, 437, 338, 420, 423, 370/507, 510, 512, 515
    See application file for complete search history.

(56) References Cited

U.S. PATENT DOCUMENTS

| | | | |
|---|---|---|---|
| 6,947,490 B1 * | 9/2005 | Edwards et al. ............... 375/261 |
| 2002/0053062 A1 * | 5/2002 | Szymanski .................... 714/801 |
| 2002/0093956 A1 * | 7/2002 | Gurin ............................ 370/389 |
| 2003/0064729 A1 * | 4/2003 | Yamashita .................... 455/451 |
| 2003/0165126 A1 | 9/2003 | Sugita |
| 2005/0047533 A1 * | 3/2005 | Ruelke et al. ................. 375/345 |
| 2005/0181831 A1 * | 8/2005 | Doi ............................ 455/562.1 |
| 2005/0226209 A1 * | 10/2005 | Miyahara et al. ............. 370/351 |
| 2006/0015909 A1 * | 1/2006 | Onomatsu et al. .............. 725/72 |
| 2006/0067417 A1 * | 3/2006 | Park et al. .................... 375/260 |
| 2006/0193339 A1 * | 8/2006 | Wang et al. .................. 370/465 |
| 2007/0038990 A1 * | 2/2007 | White et al. .................. 717/168 |
| 2007/0076811 A1 * | 4/2007 | Aldana et al. ................ 375/267 |
| 2007/0115816 A1 * | 5/2007 | Sinivaara ..................... 370/230 |
| 2007/0147533 A1 * | 6/2007 | Thomas et al. ............... 375/267 |
| 2007/0205831 A1 * | 9/2007 | Yoshikawa et al. ............ 331/16 |
| 2009/0215392 A1 * | 8/2009 | Rowse et al. ................ 455/41.2 |

FOREIGN PATENT DOCUMENTS

| | | |
|---|---|---|
| JP | 2003-188805 | 7/2003 |
| JP | 2003-209537 | 7/2003 |
| JP | 2004-282485 | 10/2004 |
| JP | 2005-252718 | 9/2005 |
| JP | 2007-531456 | 11/2007 |
| WO | WO 2005/107285 A1 | 11/2005 |

* cited by examiner

*Primary Examiner* — Alvin Zhu
(74) *Attorney, Agent, or Firm* — Oblon, Spivak, McClelland, Maier & Neustadt, L.L.P.

(57) ABSTRACT

A radio communication apparatus that performs radio communication with another communication apparatus includes an antenna unit, a contact detecting unit that detects contact with the another communication apparatus, a first modulating and demodulating unit for performing communication in a state in which the radio communication apparatus is remote from the another communication apparatus, a second modulating and demodulating unit for performing communication in a state in which the radio communication apparatus is in contact with the another communication apparatus, and a control unit that performs control to perform radio communication with the another communication apparatus via the antenna unit by selecting the first modulating and demodulating unit while the contact detecting does not detect contact with the another communication apparatus and selecting the second modulating and demodulating unit when the contact detecting unit detects contact with the another communication apparatus.

8 Claims, 7 Drawing Sheets

CONTACT DETECTION BASED RADIO CHANNEL SELECTION APPARATUS AND METHOD

CROSS-REFERENCES TO RELATED APPLICATIONS

The present invention contains subject matter related to Japanese Patent Application JP 2006-055217 filed in the Japanese Patent Office on Mar. 1, 2006, the entire contents of which being incorporated herein by reference.

BACKGROUND OF THE INVENTION

1. Field of the Invention

The present invention relates to a radio communication apparatus and a radio communication method for transmitting and receiving a signal by radio.

2. Description of the Related Art

In a radio communication system, there is known a radio communication apparatus that changes a modulation system and a transmission rate for data using information such as reception sensitivity and an error rate to perform optimum communication. For example, in general, a radio communication apparatus used for a wireless LAN or the like has a function of changing a transmission rate by switching an encoding rate in a convolutional encoder and a transmission rate of a modulation system in a modulator and realizing improvement of a communication quality.

As such a radio communication apparatus, for example, JP-A-2003-209537 discloses a technique in which a communication apparatus sets measurement conditions for transmission line characteristics corresponding to types of information transmitted, performs ranking of transmission systems on the basis of a measurement result of the transmission line characteristics, and selects a transmission system used for communication.

JP-A-2005-252718 discloses a technique for selecting one modulation system from plural modulation systems, which have different transmission rates, and modulating data while transmitting the data.

SUMMARY OF THE INVENTION

Most of radio communication apparatuses used in a radio communication system perform communication with one another with a certain degree of distance apart from one another. However, there are also known radio communication apparatuses that perform communication with one another in a state in which the radio communication apparatuses are close to or in contact with one another.

When apparatuses communicate with each other in a state in which the apparatuses are remote from each other (a remote state) and when the apparatuses communicate with each other in a state in which the apparatuses are in contact with each other (a contact state), there is a limit in control based on the information such as reception sensitivity and an error rate Thus, it is not easy to judge these states and it is difficult to optimize modulation systems and the like in the respective states.

Therefore, it is desirable to provide a radio communication apparatus and a radio communication method that can surely discriminate a state in which radio communication apparatuses are remote from one another and a state in which radio communication apparatuses are in contact with one another and perform optimum communication in the respective states.

According to an embodiment of the invention, there is provided a radio communication apparatus that performs radio communication with another communication apparatus, the radio communication apparatus including an antenna unit, contact detecting means for detecting contact with the another communication apparatus, a first modulating and demodulating unit for performing communication in a state in which the radio communication apparatus is remote from the another communication apparatus, a second modulating and demodulating unit for performing communication in a state in which the radio communication apparatus is in contact with the another communication apparatus, and a control unit that performs control such that, while the contact detecting means does not detect contact with the another communication apparatus, the first modulating and demodulating unit is selected and the radio communication apparatus performs radio communication with the another communication apparatus via the antenna unit and, when the contact detecting means detects contact with the another communication apparatus, the second modulating and demodulating unit is selected and the radio communication apparatus performs radio communication with the another communication apparatus via the antenna unit.

It is preferable that the radio communication apparatus controls directivity of the antenna unit to improve directivity to the another communication apparatus by controlling a phase of a signal between the first modulating and demodulating unit and plural antenna elements of the antenna unit. It is preferable that the second modulating and demodulating unit has plural modulators and demodulators and the plural modulators and demodulators perform parallel communication in plural channels with the another communication apparatus via the plural antenna elements of the antenna unit, respectively.

According to another embodiment of the invention, there is provided a radio communication method of performing radio communication between a radio communication apparatus and another communication apparatus, the radio communication method including the steps of: detecting contact with the another communication apparatus and performing control such that, while contact with the another communication apparatus is not detected in the contact detecting step, a first modulating and demodulating step is selected and the radio communication apparatus performs radio communication with the another communication apparatus via an antenna unit and, when contact with the another communication apparatus is detected in the contact detecting step, a second modulating and demodulating step is selected and the radio communication apparatus performs radio communication with the another communication apparatus via the antenna unit.

According to the embodiments of the invention, it is possible to improve transmission efficiency of radio communication by using different communication systems when contact with a terminal of a communication partner is detected and when contact with the terminal of the communication partner is not detected.

DESCRIPTION OF THE PREFERRED EMBODIMENTS

An embodiment of the invention will be hereinafter explained in detail with reference to the accompanying drawings.

Figure 1:
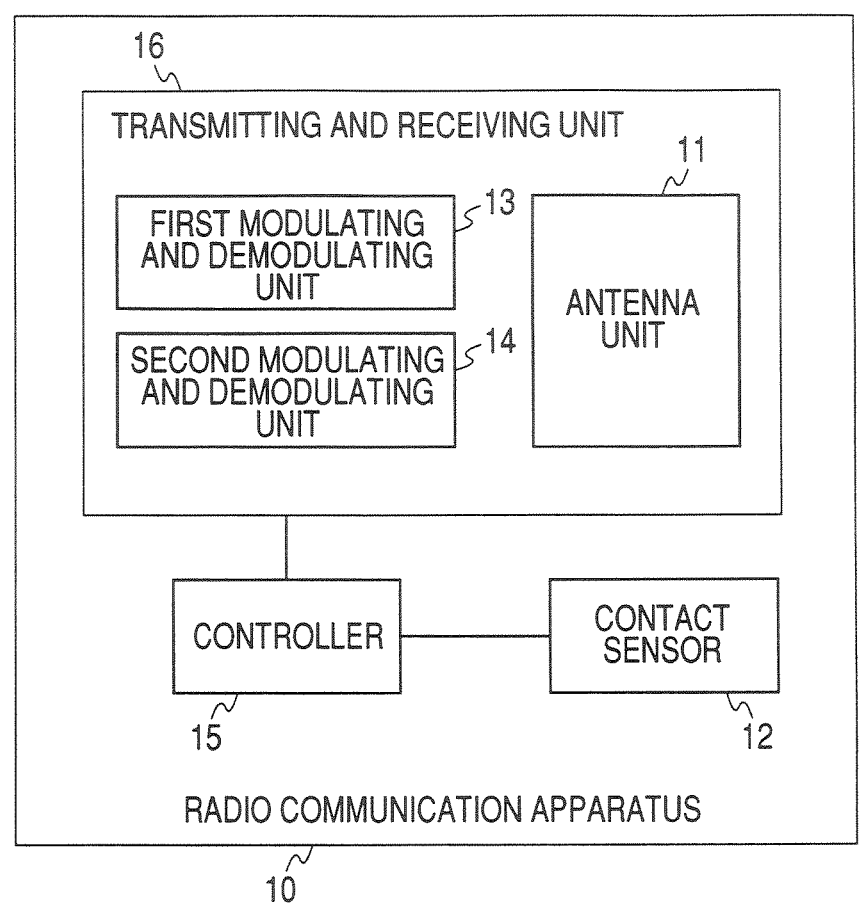
FIG. 1 is a block diagram showing a schematic structure of a radio communication apparatus according to an embodiment of the invention.

FIG. 1 is a block diagram showing a schematic structure of a radio communication apparatus according to the embodiment of the invention. A radio communication apparatus 10 shown in FIG. 1 includes an antenna unit 11, a contact sensor 12 serving as contact detecting means that detects contact with another communication apparatus, a first modulating and demodulating unit 13 for performing communication in a state in which the radio communication apparatus 10 is remote from the another communication apparatus, a second modulating and demodulating unit 14 for performing communication in a state in which the radio communication apparatus 10 is in contact with the another communication apparatus, and a controller 15 for controlling operations of the radio communication apparatus 10. The controller 15 is inputted with a contact detection signal from the contact sensor 12 and mainly controls a transmitting and receiving unit 16 including the antenna unit 11, the first modulating and demodulating unit 13, and the second modulating and demodulating unit 14. The controller 15 performs control such that, while the contact sensor 12 does not detect contact with the another communication apparatus, the first modulating and demodulating unit 13 is selected and the radio communication apparatus 10 performs radio communication with the another communication apparatus via the antenna unit 11 and, when the contact sensor 12 detects contact with another communication apparatus, the second modulating and demodulating unit 14 is selected and the radio communication apparatus 10 performs radio communication with the another communication apparatus via the antenna unit 11. In other words, the radio communication apparatus 10 basically has two communication modes. One is a remote communication or separated communication mode suitable for communication in a state in which apparatuses are remote from each other and another is a contact communication mode suitable for communication in a state in which apparatuses are in contact with each other.

Figure 2:
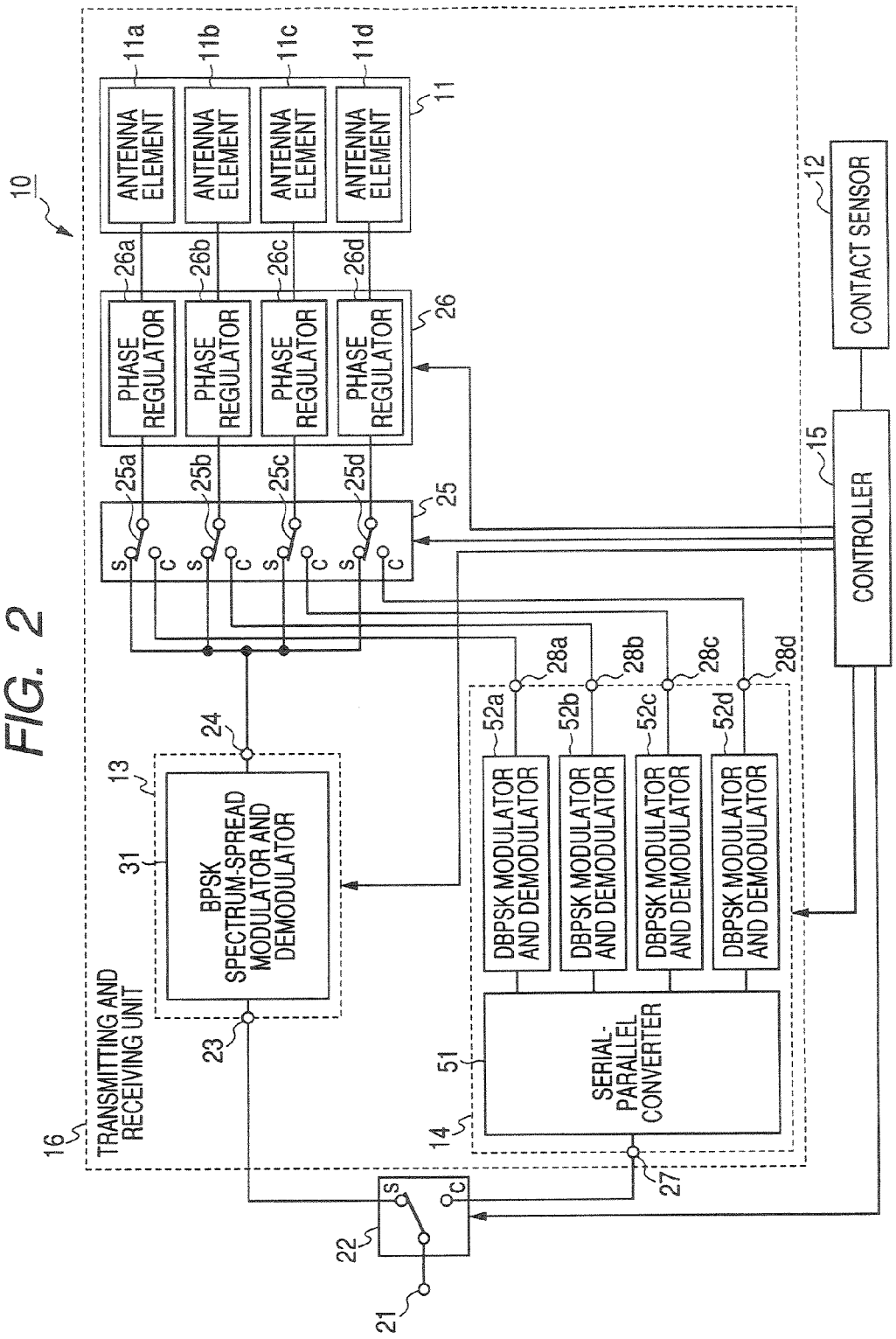
FIG. 2 is a block circuit diagram showing an example of an internal structure of the radio communication apparatus.

FIG. 2 is a block circuit diagram showing a more specific example of a structure of the radio communication apparatus 10 in FIG. 1. In FIG. 2, a signal input/output terminal 21 is connected to a common terminal of a changeover switch 22, a selected terminal "s" of the changeover switch 22 is connected to a terminal 23 of the first modulating and demodulating unit 13 serving as a remote communication unit that performs modulation and demodulation in a communication system suitable for remote communication, and a terminal 24 of the first modulating and demodulating unit 13 is connected to respective selected terminals "s" of plural, for example, four changeover switches 25a, 25b, 25c, and 25d. Common terminals of these changeover switches 25a, 25b, 25c, and 25d are connected to four antenna elements 11a, 11b, 11c, and 11d of the antenna unit 11 via four phase regulators 26a, 26b, 26c, and 26d of a phase control unit 26, respectively. A selected terminal "c" of the changeover switch 22 is connected to a terminal 27 of the second modulating and demodulating unit 14 serving as a contact communication unit that performs modulation and demodulation in a communication system suitable for contact communication. Terminals 28a, 28b, 28c, and 28d of the second modulating and demodulating unit 14 are connected to selected terminals "c" of the four changeover switches 25a, 25b, 25c, and 25d, respectively.

The controller 15 subjects changeover switches 22 and 25 for switching and selecting the first and the second modulating and demodulating units 13 and 14 corresponding to the remote communication mode and the contact communication mode to changeover control and controls operations of the phase control unit 26 according to a contact detection signal from the contact sensor 12. As the control of the phase control unit 26 by the controller 15, in the remote communication mode, the controller 15 adjusts phases of signals to the respective antenna elements 11a to 11d of the antenna unit 11 using the phase regulators 26a to 26d, controls directivity of the antenna unit 11, and converges beams to cause the antenna elements 11a to 11d to perform communication in a single channel In the contact communication mode, the controller 15 causes the antenna elements 11a to 11d of the antenna unit 11 to perform communication in plural channels (four channels) in parallel. The controller 15 performs internal operation control (e.g., control for switching transmission and reception) for the first and the second modulating and demodulating units 13 and 14.

In the first modulator and demodulator 13 for the remote communication mode, it is preferable to use a circuit of a communication system that, even if a symbol rate and a data rate are lowered, optimizes a signal by performing communication robust against multi-path, converging beams in plural antenna elements, and correcting a waveform distortion of a transmission channel using an equalizer. For example, it is possible to use a BPSK (Binary Phase Shift Keying) spectrum-spread modulator and demodulator 31. In the second modulating and demodulating unit 14 for the contact communication mode, it is preferable to use a circuit that performs independent communication in each of plural antenna elements, parallelizes the antenna elements to increase a data rate, and performs simple high-speed communication. For example, it is possible to use a serial-parallel converter 51 and DBPSK (Differential Binary Phase Shift Keying) modulators and demodulators 52a, 52b, 52c, and 52d that operate inparallel in plural channels (four channels). Specific examples of internal structures of these devices will be described later.

Figure 3:
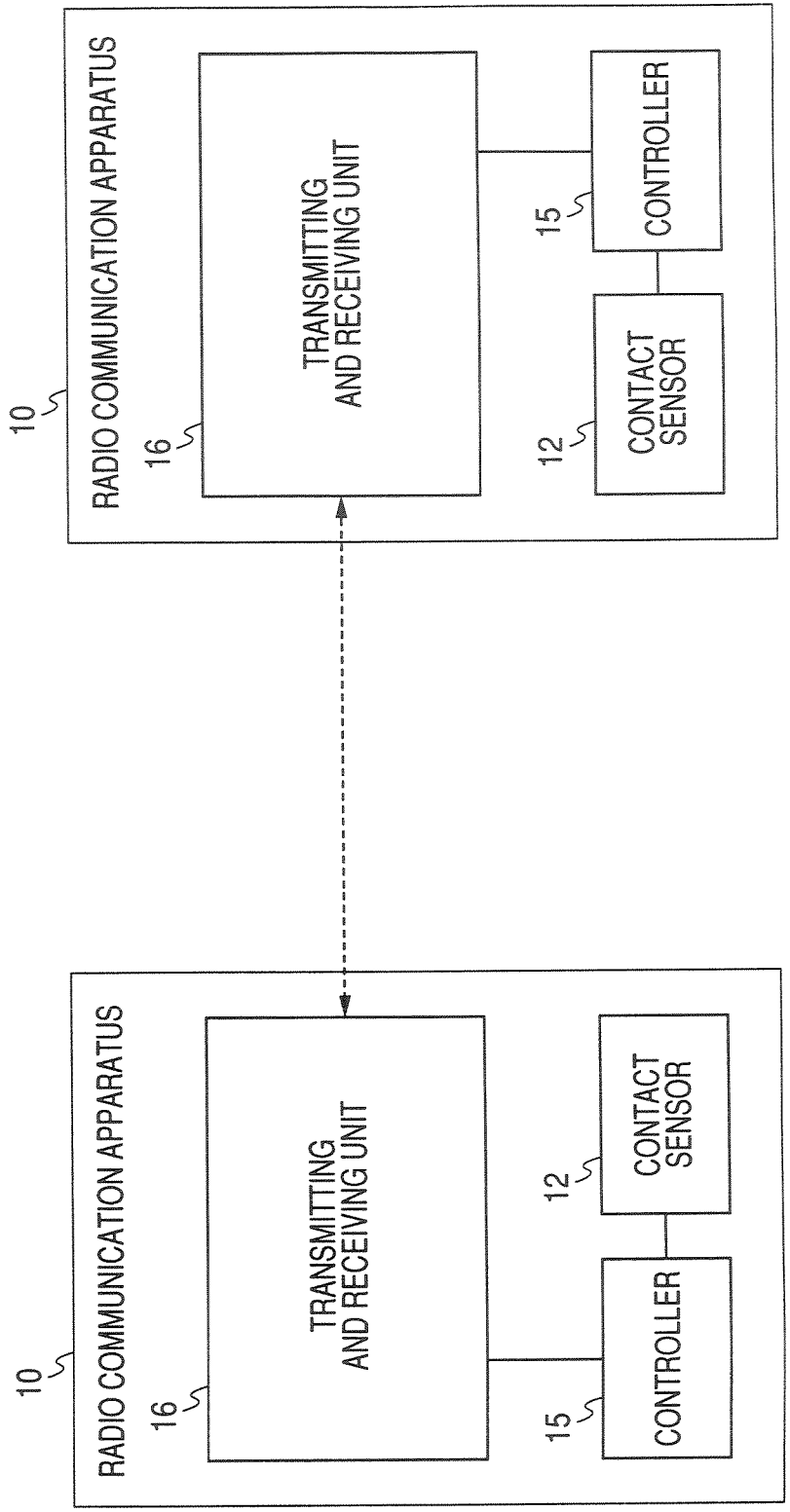
FIG. 3 is a schematic diagram showing a state of the radio communication apparatus in a remote communication mode.

FIG. 3 shows a state in which radio communication is performed in the remote communication mode. In the remote communication mode, a symbol rate (the number of symbols that can be transmitted in a unit time) and a data rate (the number of bits that can be transmitted in a unit time) are controlled low to perform communication robust against multi-path. Antenna elements converges beams to optimize a signal.

Figure 4:
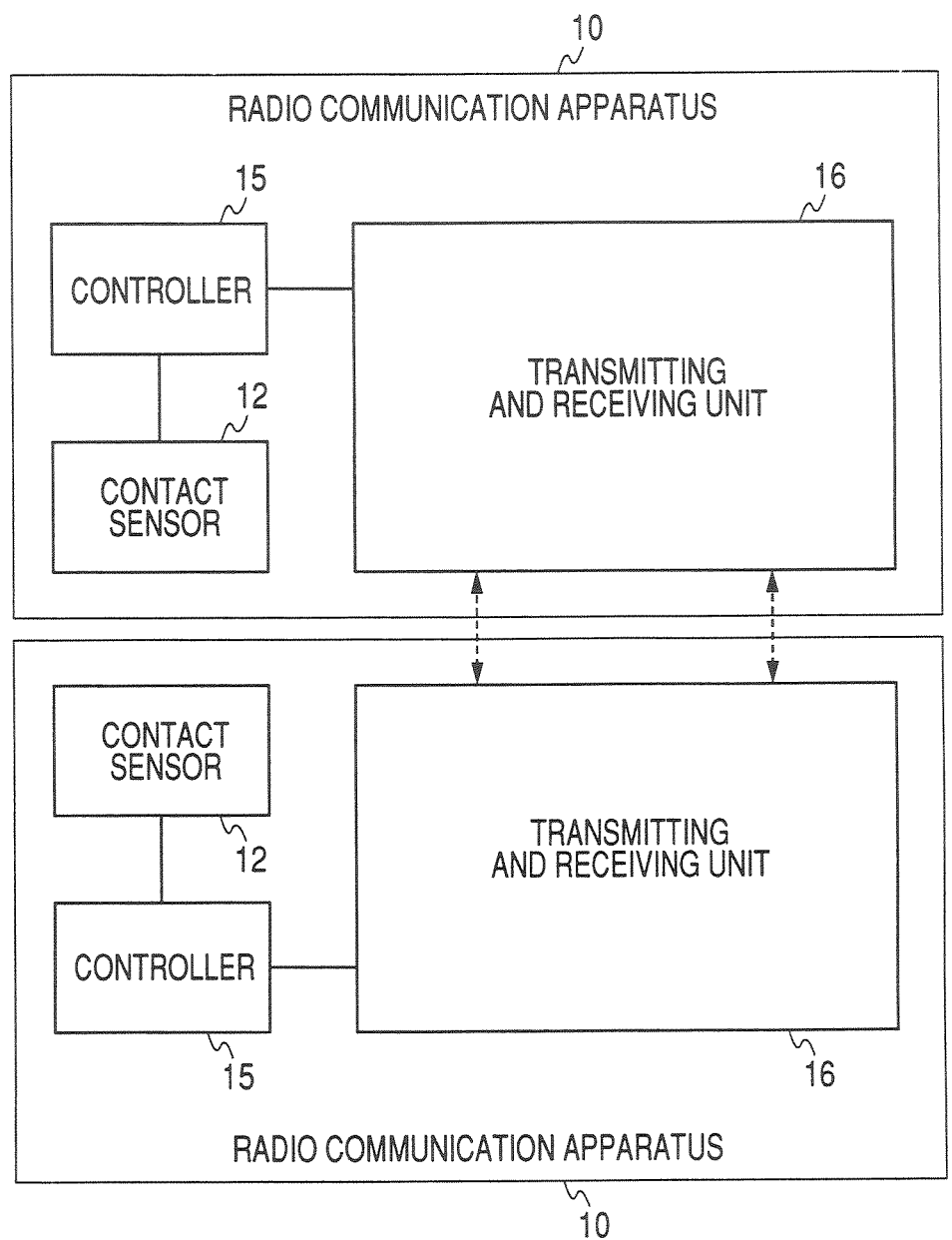
FIG. 4 is a schematic diagram showing a state of the radio communication apparatus in a contact communication mode.

FIG. 4 shows a state in which radio communication is performed in the contact communication mode. In the contact communication mode, respective antenna elements perform independent communication. In the contact communication mode, the antennal elements are parallelized to increase a data rate. In the contact communication mode, it is possible to perform simple high-speed communication because a transmission line is short and there is no long multi-path.

In the remote communication mode shown in FIG. 3, both the changeover switches 22 and 25 in FIG. 2 are changed over and connected to the selected terminal "s" side and the first modulating and demodulating unit 13 comes into an operation state. In the radio communication apparatus 10 on a transmission side, a transmission signal inputted from the data input/output terminal 21 is inputted to the first modulating and demodulating unit 13, subjected to, for example, BPSK modulation described later, and sent to the phase control unit 26 via the changeover switch 25. The phase control unit 26 adjusts phases of signals outputted to the respective antenna elements 11a to 11d of the antenna unit 11 and gives directivity to a radio wave outputted.

In the remote communication mode, in the radio communication apparatus 10 on a reception side, the antenna unit 11 receives a radio wave transmitted from the transmission side and signals from the respective antenna elements 11a to 11d are sent to the respective phase regulators 28a to 28d of the phase control unit 26. The phase control unit 28 estimates an arrival direction of the radio wave according to delays in arrival times of the signals from the respective antenna elements 11a to 11d. The phase control unit 28 multiplies respective antenna signals by a weight on the basis of the estimated arrival direction and combines the antenna signals to extract a signal arriving from a specific direction. The first modulating and demodulating unit 13 subjects a signal received by the antenna to, for example, BPSK demodulation and outputs the signal to the outside from the terminal 21 via the changeover switch 22.

In the contact communication mode shown in FIG. 4, both the switches 22 and 25 in FIG. 2 are changed over and connected to the selected terminal "c" side and the second modulating and demodulating unit 14 comes into an operation state. In the radio communication apparatus 10 on the transmission side in this contact communication mode, a transmission signal inputted from the data input/output terminal 21 is inputted to the second modulating and demodulating unit 14, serial-parallel converted into signals in plural channels (four channels, for example). The signals are subjected to, for example, DBPSK modulation described later in parallel and sent to the antenna elements 11a to 11d of the antenna unit 11, respectively, via the change over switch 25 and the phase control unit 26. In DBPSK modulation, since a transmission signal is subjected to differential coding, a circuit configuration is simplified, for example, carrier synchronization of a demodulator is unnecessary. Moreover, a satisfactory demodulation characteristic is obtained in fading that occurs in a transmission line. In this contact communication mode, a carrier wave is a millimeter wave having a wavelength longer than that of a microwave. The millimeter wave has a frequency of 30 GHz to 300 GHz. Thus, it is possible to realize a reduction in sizes of an antenna and an apparatus and use a wide band. The millimeter wave has a characteristic that the millimeter wave can be transmitted in multiple stages using the same frequency making use of a nature that a radio wave hardly reaches the distance. The millimeter wave is suitable for high-capacity communication. In this embodiment, a data rate of in a unit of 10 Gbps (bit per second) is assumed. Modulated waves are outputted in parallel using the four antenna elements 11a to 11d, respectively.

In the radio communication apparatus 10 on the reception side in the contact communication mode, radio waves transmitted from the transmission side are received by the antenna elements 11a to 11d in parallel, demodulated (e.g., DBPSK demodulation) in the second modulating and demodulating unit 14 in parallel, parallel-serial converted, and then outputted to the outside from the terminal 21.

As the contact sensor 12, for example, there are an electric sensor that detects contact according to a change in an electrostatic capacity, an optical sensor that checks contact according to a state of reflection of light, and a mechanical switch that detects contact according to depression of a switch.

The number of antenna elements and the number of parallel channels are not limited to four. It is also possible to design the antenna elements and the parallel channels in an arbitrary number. The modulators and demodulators used in the first and the second modulating and demodulating units 13 and 14 are not limited to the BPSK spectrum-spread modulator and demodulator and the DBPSK modulator and demodulator. For example, a DQPSK (Differential Quadrature Phase Shift Keying) modulator and demodulator may be used instead of the DBPSK modulator and demodulator. Instead of arranging the phase control unit 26 between the changeover switch 25 and the antenna unit 11, a phase control unit or a phase combining unit for controlling phases of signals to respective antenna elements and controlling directivity may be provided between the first modulating and demodulating unit 13 and the changeover switch 25.

Figure 5:
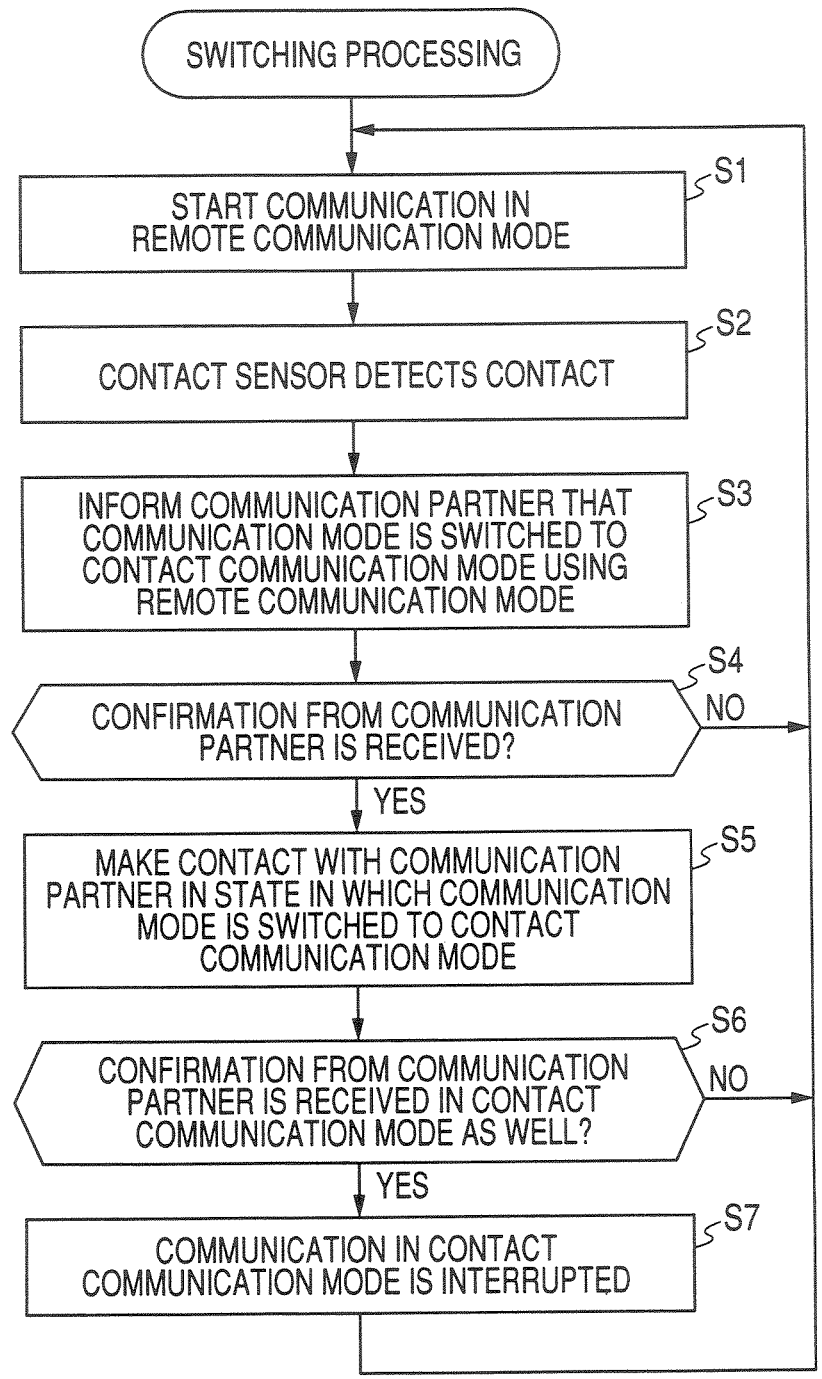
FIG. 5 is a flowchart for explaining an operation for switching the communication modes.

FIG. 5 is a flowchart for explaining an operation for switching the communication modes by the controller 15. The controller 15 performs switching of the remote communication mode and the contact communication mode on the basis of a detection result of the contact sensor 12 or the like. A default or initial state of switching processing in this embodiment is set as the remote communication mode.

In step S1 in FIG. 5, the controller 15 starts communication in the remote communication mode. In step S2, when the contact sensor 12 detects contact with another communication apparatus, the controller 15 proceeds to step S3 and informs, using remote communication, the radio communication apparatus of the communication partner that the remote communication mode is switched to the contact communication mode. When confirmation is received from the communication partner (step S4; YES), the controller 15 shifts to step S5. On the other hand, when confirmation from the communication partner is not received (step S4; NO), the controller 15 returns to step S1.

In step S5, the controller 15 switches the communication mode to the contact communication mode and makes contact with the communication partner in a state in which the communication mode is switched to the contact communication mode. In the contact communication mode, as in the remote communication mode, when confirmation of the communication partner is received (step S6; YES), the controller 15 shifts to step S7. On the other hand, when confirmation is not received from the communication partner (step S6; NO), the controller 15 returns to step S1.

As described above, when confirmation from the communication partner is not received in steps S4 and S6, the controller 15 returns to step S1. This is for the purpose of switching the contact communication mode to the remote communication mode and surely performing communication when it is difficult to perform effective communication in the contact communication mode.

In step S7, the controller 15 transmits binary data for transmission in the contact communication mode (parallel channel transmission) When the communication in the contact communication mode is interrupted or a wrong reply is received in step S7, the controller 15 returns to step S1 and switches the contact communication mode to the remote communication mode.

As explained above, in the radio communication apparatus 10 according to the embodiment, it is possible to execute both communication suitable for a contact state and communication suitable for a remote state. The remote communication mode at the time when the radio communication apparatus 10 is remote from the radio communication apparatus 10 of the communication partner and the contact communication mode at the time when the communication apparatus 10 is in contact with the radio communication apparatus 10 of the communication partner are switched.

In the remote communication mode, reliability of communication is given priority. The remote communication mode is set to spread the data and be robust against multi-path. Although processing is complicated and a symbol rate and a data rate are not high, it is possible to perform stable and highly-reliable communication even if a distance to a communication partner is long. In the contact communication mode, priority is given to a communication capacity. Although communication becomes unstable when a distance to a communication partner is long, a modulation system is simplified, a large quantity of data are processed at high speed, and antenna elements are parallelized to further increase a data rate. In the contact communication mode, a millimeter wave suitable for a large capacity communication is used to increase a data rate.

It is difficult to judge the remote communication mode and the contact communication mode only from a signal received. However, in the radio communication apparatus 10 according to the embodiment, since the contact sensor 12 is provided, it is possible to easily detect contact. In the radio communication apparatus 10 according to the embodiment, communication in the stable remote communication mode is performed first and, when the contact sensor 12 detects contact, switching of the modes is confirmed using remote communication and then the remote communication mode is switched to the contact communication mode. Consequently, wrong recognition of the contact sensor 12 or the like is prevented.

Specific examples of internal structures of the first and the second modulating and demodulating units 13 and 14 will be explained with reference to FIGS. 6 and 7.

Figure 6:
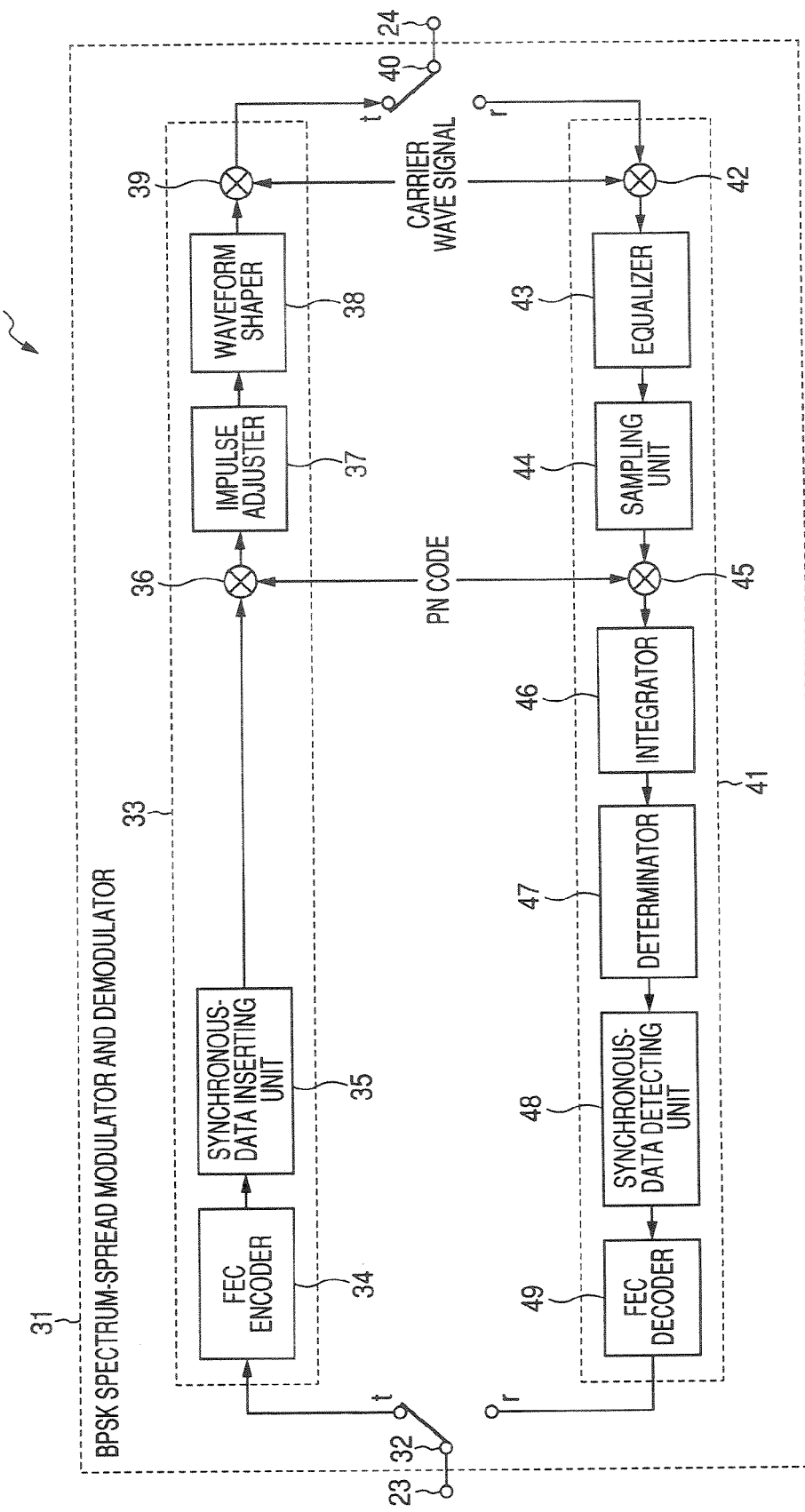
FIG. 6 is a block circuit diagram showing a specific example of a structure of a first modulating and demodulating unit.

FIG. 6 is a block circuit diagram showing the BPSK spectrum-spread modulator and demodulator 31 as a specific example of a structure of the first modulating and demodulating unit 13 for performing communication suitable for the remote state. In FIG. 6, the BPSK spectrum-spread modulator and demodulator 31 has a structure in which a modulating circuit system 33 and a demodulating circuit system 41 corresponding to transmission and reception or modulation and demodulation are switched and selected by changeover switches 32 and 40. The changeover switches 32 and 40 are subjected to changeover control by the controller 15 according to transmission and reception (or modulation and demodulation) operations. In other words, the terminal 23 of the first modulating and demodulating unit 13 is connected to a common terminal of the changeover switch 32, a selected terminal "t" of the changeover switch 32 is connected to an FEC (Forward Error Correction) encoder 34 on an input side of the modulating circuit system 33, a multiplier 39 on an output side of the modulating circuit system 33 is connected to a selected terminal "t" of the changeover switch 40, and a common terminal of the changeover switch 40 is connected to the terminal 24 of the first modulating and demodulating unit 13. A selected terminal "r" of the changeover switch 40 is connected to a multiplier 42 on an input side of the demodulating circuit system 41 and an FEC decoder 49 on an output side of the demodulating circuit system 41 is connected to a selected terminal "r" of the changeover switch 32. At the time of a transmission (modulation) operation, both the changeover switches 32 and 40 are changed over and connected to the selected terminal "t" side. At the time of a reception (demodulation) operation, both the changeover switches 32 and 40 are changed over and connected to the selected terminal "r" side.

The modulating circuit system 33 has a structure of a normal BPSK spectrum-spread modulator. In the example in FIG. 6, the modulating circuit system 33 includes, in order from the input side, the FEC encoder 34 that inserts redundant data of the FEC into a transmission signal, a synchronous-data inserting unit 35 that inserts synchronous data, a multiplier 36 that performs spectrum spread modulation using a PN code (Pseudo-Random number), an impulse adjuster 37 that adjusts an impulse response, a waveform shaper 38 that shapes a spectrum shape of the transmission signal to be within a necessary band, and the modulator (a multiplier) 39 that modulates a carrier wave using the transmission signal.

The FEC encoder 34 inserts redundant data for correcting an error using a Reed-Solomon code, a Trellis code, and the like. The synchronous-data inserting unit 35 inserts synchronous data into the front, the end, and the like of the Reed-Solomon code. The multiplier 36 multiplies an output from the synchronous-data inserting unit 35 by a fast pseudo-random code irrelevant to an inputted transmission signal called a PN code and applies spectrum spread modulation for spreading the transmission signal to a wide band to the output. The waveform shaper 38 performs band limitation for a signal. The impulse adjuster 37 adjusts an impulse of the waveform shaper 38 to prevent inter-symbol interference. The modulator (the multiplier) 39 modulates a carrier wave signal $\cos(2\pi f_0 t + \phi_k)$ using the transmission signal.

The carrier wave signal modulated is extracted from the terminal 24 via the switch 40 and sent to the phase regulators 26a to 26d of the phase control unit 26 via the selected terminals "s" of the plural changeover switches 25a to 25d of the changeover switch 25 in FIG. 2, respectively. The phase regulators 26a to 26d of the phase control unit 26 shift a phase of the carrier wave signal modulated and give directivity of radio waves outputted from the antenna elements 11a to 11d of the antenna unit 22, respectively. The antenna unit 22 transmits the carrier wave modulated to the radio communication apparatus 10 on the reception side.

The demodulating circuit system 41 has a structure of a normal BPSK spectrum-inverse-spread demodulator. In the example in FIG. 6, the demodulating circuit system 41 includes the demodulator (a multiplier) 42 that demodulates a received signal using a carrier wave signal, an equalizer 43 that returns a deteriorated waveform of a reception signal to an original signal waveform, a sampling unit 44 that samples an output of the equalizer 43 at a predetermined period, a multiplier 45 that multiplies an PN code by a sampled signal and subjects the PN code and the signal to spectrum inverse spread processing, an integrator 46 that integrates an output from the multiplier 45, a determinator 47 that determines symbol data, a synchronous-data detecting unit 48 that detects synchronous data, and an FEC decoder 49 that performs error correction according to forward error correction.

At the time of signal reception, when a radio wave is received, the phase control unit 26 in FIG. 2 estimates an arrival direction of the radio wave according to delays in arrival times of signals in the antenna elements 11a to 11d of the antenna unit 22. The phase control unit 26 multiplies the respective antenna signals by a weight on the basis of the arrival direction estimated, combines the antenna signals to extract a signal arriving from a specific direction, and sends the signal to the terminal 24. The demodulator (the multiplier) 42 of the decoding circuit system 41 in FIG. 6 demodulates a reception signal from the terminal 24 using a carrier wave signal $\cos(2\pi f_0 t+\phi_k)$. The equalizer 43 approximates a transmission signal, which is deteriorated by passing through a transmission line, to an original transmission signal. The sampling unit 44 samples an output of the equalizer 43 at a predetermined period. A sampled signal is multiplied by a PN code in the multiplier 45. The signal multiplied is integrated by the integrator 46, whereby inverse spread demodulation is performed. The determinator 47 determines a symbol of a received signal. In BPSK, phase modulation is performed in a unit of one bit. For example, it is determined that, when a phase is 0, transmission data is "0" and, when a phase is π, transmission data is "1". The synchronous-data detecting unit 48 detects synchronous data. The FEC decoder 49 performs error correction using inserted redundant data. The demodulating circuit system 41 includes, as a structure suitable for remote communication, the equalizer 43 that returns a deteriorated waveform received by an antenna to an original signal waveform.

Figure 7:
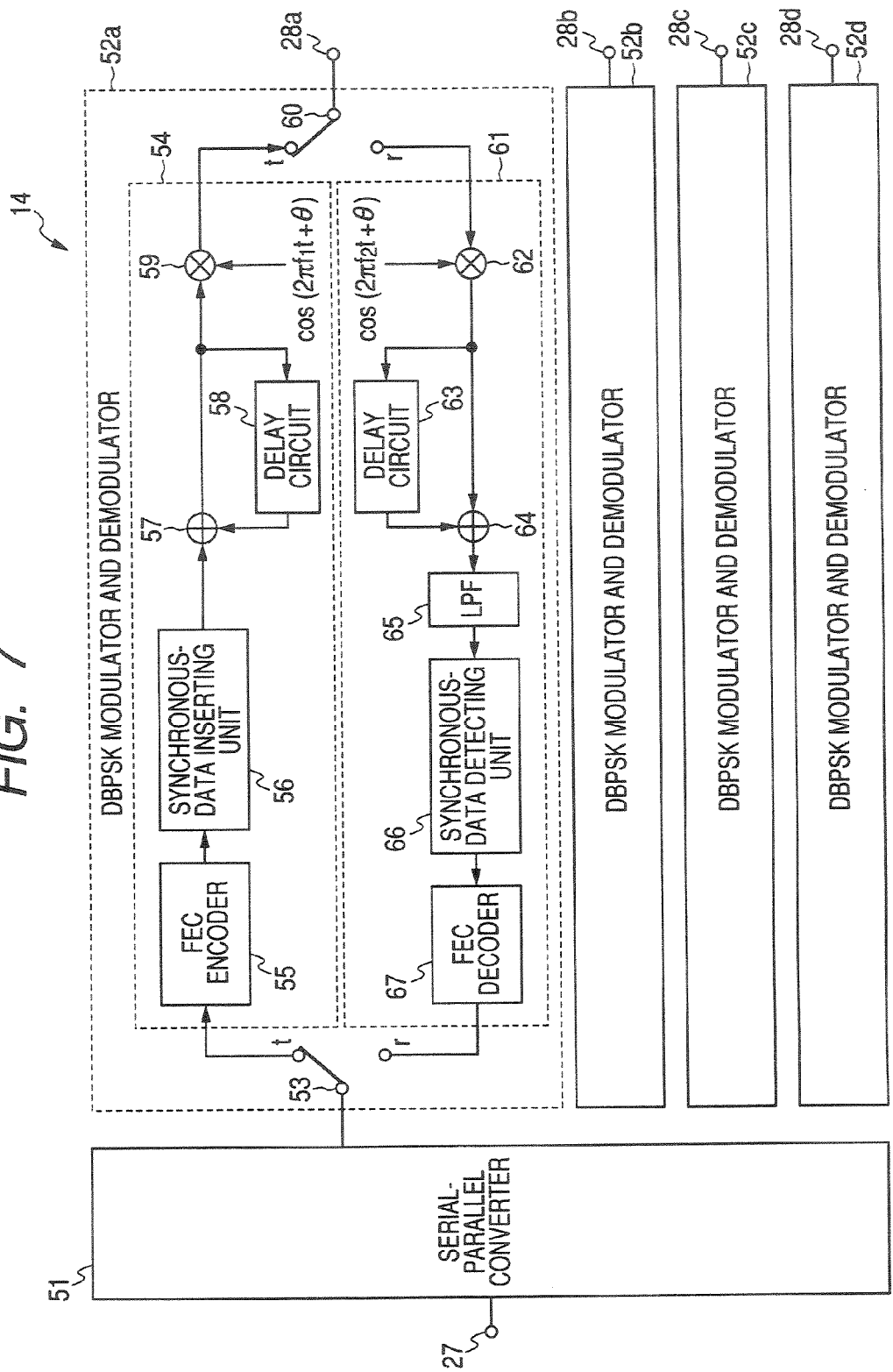
FIG. 7 is a block circuit diagram showing a specific example of a structure of a second modulating and demodulating unit.

FIG. 7 is a block circuit diagram showing a specific example of a structure of the DBPSK modulator and demodulator 52 of the second modulating and demodulating unit 14 for performing communication suitable for the contact state. In FIG. 7, the terminal 27 is connected to a serial side of the serial-parallel converter 51 and the plural (e.g., four) DBPSK modulators and demodulators 52a to 52d are connected to a parallel side thereof. Since all of the DBPSK modulators and demodulators 52a to 52d have the same structure, only an internal structure of the DBPSK modulator and demodulator 52a is shown. Concerning the other DBPSK modulators and demodulators 52b to 52d, illustration of internal structures are omitted and explanations thereof are also omitted. The DBPSK modulator and demodulator 52a has a structure in which a modulating circuit system 54 and a demodulating circuit system 61 corresponding to transmission and reception or modulation and demodulation are switched and selected by changeover switches 53 and 60. The changeover switches 53 and 60 are subjected to changeover control by the controller 15 in FIG. 2 according to transmission and reception (or modulation and demodulation) operations. In other words, a common terminal of the changeover switch 53 is connected to the parallel side of the serial-parallel converter 51, a selected terminal "t" of the changeover switch 53 is connected to an FEC encoder 55 on an input side of the modulating circuit system 54, a multiplier 59 of the modulating circuit system 54 is connected to a selected terminal "t" of the changeover switch 60, and a common terminal of the changeover switch 60 is connected to the terminal 28a of the second modulating and demodulating unit 14. A selected terminal "r" of the changeover switch 60 is connected to a multiplier 62 on an input side of the demodulating circuit system 61 and an FEC decoder 67 on an output side of the demodulating circuit system 61 is connected to a selected terminal "r" of the changeover switch 53. As the time of a transmission (modulation) operation, both the changeover switches 53 and 60 are changed over and connected to the selected terminal "t" side. At the time of a reception (demodulation) operation, both the changeover switches 53 and 60 are changed over and connected to the selected terminal "r" side.

At the time of transmission, the serial-parallel converter 51 serial-parallel converts a signal from the terminal 27 into 1-bit input/4-bit output and sends each bit of the output four bits to the DBPSK modulators and demodulators 52a to 52d, respectively. At the time of reception, the serial-parallel converter 51 parallel-serial converts signals from the DBPSK modulators and demodulators 52a to 52d into 4-bit input/1-bit output and sends the signals to the terminal 27. This serial-parallel conversion/parallel-serial conversion is also subjected to changeover control by the controller 15 in FIG. 2.

The modulating circuit system 54 in the DBPSK modulator and demodulator 52a constitutes a normal DPSK modulator. The modulating circuit system 54 includes the FEC encoder 55 that inserts redundant data of the FEC into binary data for transmission, a synchronous-data inserting unit 56 that inserts synchronous data, an adder 57, a delay circuit 58 that returns an addition output to the adder 57 with a delay of a predetermined time, and a modulator (a multiplier) 59 that modulates a carrier wave using a transmission signal.

The FEC encoder 55 inserts redundant data for correcting an error using a Reed-Solomon code, a Trellis code, and the like. The synchronous-data inserting unit 56 inserts synchronous data into the front, the end, and the like of the Reed-Solomon code. The modulator 59 modulates a carrier wave signal $\cos(2\pi f_1 t+\theta)$ using a transmission signal. The carrier wave signal modulated is extracted from the terminal 28a and sent to the antenna element 11a of the antenna unit 11 via the changeover switch 25a in FIG. 2 and the phase regulator 26a of the phase control unit 26. Concerning the DBPSK modulators and demodulators 52b to 52d, modulated carrier waves are sent to the antenna elements 11b to 11d in the same manner. The carrier waves are transmitted to a communication apparatus of a communication partner in parallel in four channels.

The demodulating circuit system 61 in the DBPSK modulator and demodulator 52a constitutes a normal DPSK demodulator. The demodulating circuit system 61 includes the demodulator (the multiplier) 62 that multiplies a received signal by a carrier wave and demodulates the signal, a delay circuit 63 that delays the signal demodulated, an adder 64 that adds a signal from the demodulator (the multiplier) 62 and a signal from the delay circuit 63, an LPF (low-pass filter) 65 that removes noise of a signal, a synchronous-data detecting unit 66 that detects synchronous data, and an FEC decoder 67 that performs error correction according to forward error correction.

The demodulator 62 demodulates a received signal using a carrier wave signal $\cos(2\pi f_2 t+\theta)$. The LPF 65 removes noise of the signal demodulated. A determinator determines a symbol of the received signal. The synchronous-data detecting unit 66 detects synchronous data. The FEC decoder 67 performs error correction using inserted redundant data.

In this contact communication mode, phase adjustment in the phase regulators 26a to 26d of the phase control unit 26 in FIG. 2 is not always necessary. However, it is possible to shift phases of carrier waves transmitted in parallel to control interference by delaying the carrier waves and match phases of carrier waves received in the antenna elements 11a to 11d. It is possible to use the phase adjustment for identification of channel interference and the like.

As explained above, in the radio communication apparatus 10 according to the embodiment, it is possible to switch both the contact communication mode suitable for the contact state and the remote communication mode suitable for the remote state. In the remote communication mode, reliability of communication is given priority. Data is spread and the remote communication mode is set to be robust against multi-path. Although processing is complicated and a symbol rate and a data rate are not high, it is possible to perform stable and highly-reliable communication even if a distance to a communication partner is long. In the contact communication mode, priority is given to a communication capacity. Although communication becomes unstable when a distance to a communication partner is long, a modulation system is simplified, a large quantity of data are processed at high speed, and antenna elements are parallelized to further increase a data rate.

It is difficult to switch the remote communication mode and the contact communication mode only from a signal received. However, in the radio communication apparatus 10 according to the embodiment, since the contact sensor 12 is provided, it is possible to easily and surely detect contact. In the radio communication apparatus 10 according to the embodiment, communication in the stable remote communication mode is performed first and, when the contact sensor 12 detects contact, switching of the modes is confirmed using remote communication and then the remote communication mode is switched to the contact communication mode. Consequently, wrong recognition of the contact sensor 12 or the like is prevented.

The invention is not limited to the embodiment. For example, in the embodiment, BPSK and DBPSK are explained as examples of a modulation system. However, the modulation system is not limited to these systems. When communication is performed between two radio communication apparatuses, the contact sensor only has to be provided in at least one of the radio communication apparatuses. In the embodiment, the radio communication apparatus has both the transmission function and the reception function. However, one radio communication apparatus only has to have the transmission function and the other radio communication apparatus only has to have the reception function. Besides, various modifications are possible without departing from the spirit of the invention.

It should be understood by those skilled in the art that various modifications, combinations, sub-combinations, and alterations may occur depending on design requirements and other factors insofar as they are within the scope of the appended claims or the equivalents thereof.

What is claimed is:

1. A radio communication apparatus that performs radio communication with another communication apparatus, the radio communication apparatus comprising:
    an antenna including plural antenna elements;
    a mechanical switch configured to detect contact between at least one physical surface of the another communication apparatus and the radio communication apparatus and to generate a contact detection signal, the mechanical switch detecting contact through depression thereof;
    a first modulating and demodulating circuit to communicate an input signal by a single communication channel when the radio communication apparatus is not in physical contact with the another communication apparatus, the first modulating demodulating circuit including circuitry to insert redundant forward error correction data into the input signal, insert synchronous data into the input signal after the redundant forward error correction data is inserted, multiply the input signal with a pseudo-random number to generate a spread spectrum signal, adjust an impulse response of an output signal of the multiplier, and shape a frequency spectrum of an output signal of the impulse adjuster, an output of the waveform shaper being communicated via the single communication channel when the radio communication apparatus is not in physical contact with the another communication apparatus;
    a second modulating and demodulating circuit to communicate the input signal by a plurality of communication channels when the radio communication apparatus is in physical contact with the another communication apparatus, the second modulating and demodulating circuit including a plurality of modulating circuits, each modulating circuit inserting redundant forward error correction data into the input signal, inserting synchronous data into the input signal after the redundant forward error correction data is inserted, adding a delayed adder output to an output of the synchronous data, and modulating an output of the adder with a predetermined transmission frequency; and
    a control circuit to control communication based on the contact detection signal, wherein,
        while the contact detection signal indicates that the mechanical switch does not detect contact with the another communication apparatus, the control circuit selects the first modulating and demodulating circuit to perform radio communication with the another communication apparatus via the plural antenna elements by the single communication channel and,
        when the contact detection signal indicates that the mechanical switch detects contact with the another communication apparatus, the control circuit selects the second modulating and demodulating circuit to perform radio communication with the another communication apparatus via the plural antenna elements by the plurality of communication channels.

2. A radio communication apparatus according to claim 1, wherein
    the first modulating and demodulating circuit includes a single modulator and demodulator and,
    while the contact detection signal indicates that the mechanical switch does not detect contact with the another communication apparatus, the radio communication apparatus controls directivity of the plural antenna elements to improve directivity to the another communication apparatus by controlling a phase of an output signal of the first modulating and demodulating circuit individually with respect to each of the plural antenna elements of the antenna.

3. A radio communication apparatus according to claim 1, wherein
    the second modulating and demodulating circuit includes circuitry to serial-to-parallel convert, at a time of transmission, the input signal and send the converted input signal to the plural modulating circuit, and, at a time of reception, to parallel-to-serial convert signals from the plural modulating circuits and output the converted signals.

4. A radio communication apparatus according to claim 1, wherein
    the control circuit is further configured to perform control such that, at the time of communication start, communication is performed in a state in which the first modulating and demodulating circuit is connected to the antenna and, when the contact detection signal indicates that the mechanical switch detects contact with the another communication apparatus, the second modulating and demodulating circuit is switched to be connected to the antenna to perform communication.

5. A radio communication apparatus according to claim 1, wherein
    the first modulating and demodulating circuit is further configured to perform communication in a remote communication mode,
    the second modulating and demodulating circuit is further configured to perform communication in a contact communication mode, and
    the control circuit is further configured to perform control such that, when the contact detection signal indicates that contact with the another communication apparatus is detected, the radio communication apparatus informs the another communication apparatus by the remote communication mode that the remote communication mode is switched to the contact communication mode and, when the radio communication apparatus receives confirmation of the communication mode switch from the another communication apparatus, the radio communication apparatus performs radio communication in the contact communication mode via the antenna.

6. A radio communication method of performing radio communication between a radio communication apparatus and another communication apparatus, the radio communication method comprising:

detecting, by depression of a mechanical switch, contact between at least one physical surface of the another communication apparatus and the radio communication apparatus;

generating a contact detection signal from the mechanical switch based on the detected contact; and performing control in response to the contact detection signal, where, while the contact detection signal indicates that contact with the another communication apparatus is not detected, selecting a first modulating and demodulating circuit and communicating an input signal with the another communication apparatus via plural antenna elements by a single communication channel including inserting redundant forward error correction data into the input signal, inserting synchronous data into the input signal after the redundant forward error correction data is inserted, multiplying the input signal with a pseudo-random number to generate a spread spectrum signal, adjusting an impulse response of an output signal of the multiplier, and shaping a frequency spectrum of an output signal of the impulse adjuster, an output of the waveform shaper being communicated via the single communication channel when the radio communication apparatus is not in physical contact with the another communication apparatus, and, when the contact detection signal indicates that contact with the another communication apparatus is detected, selecting a second modulating and demodulating circuit and communicating the input signal with the another communication apparatus via the plural antenna elements by a plurality of communication channels, including, in each of a plurality of modulating circuits of the second modulating and demodulating circuit inserting redundant forward error correction data into the input signal, inserting synchronous data into the input signal after the redundant forward error correction data is inserted, adding a delayed adder output to an output of the synchronous data unit, and modulating an output of the adder with a predetermined transmission frequency.

7. A radio communication apparatus according to claim 1, further comprising:

a changeover switch that selects whether the first modulating and demodulating circuit or the second modulating and demodulating circuit is coupled to the antenna.

8. A radio communication method according to claim 6, wherein selecting the first modulating and demodulating circuit comprises communication in a remote communication mode, selecting the second modulating and demodulating circuit comprises performing communication in a contact communication mode, and the performing control further comprises, when the contact detection signal indicates contact with the another communication apparatus is detected, informing the another communication apparatus by the remote communication mode that the remote communication mode is switched to the contact communication mode, and, when the radio communication apparatus receives confirmation of the communication mode switch from the another communication apparatus, performing radio communication in the contact communication mode via the antenna.

* * * * *